United States Patent
Guha

(10) Patent No.: US 8,140,584 B2
(45) Date of Patent: Mar. 20, 2012

(54) ADAPTIVE DATA CLASSIFICATION FOR DATA MINING

(76) Inventor: Aloke Guha, Louisville, CO (US)

(*) Notice: Subject to any disclaimer, the term of this patent is extended or adjusted under 35 U.S.C. 154(b) by 319 days.

(21) Appl. No.: 12/331,363

(22) Filed: Dec. 9, 2008

(65) Prior Publication Data

US 2009/0164416 A1    Jun. 25, 2009

Related U.S. Application Data

(60) Provisional application No. 61/012,761, filed on Dec. 10, 2007.

(51) Int. Cl.
*G06F 17/30* (2006.01)
(52) U.S. Cl. ........................................................ 707/802
(58) Field of Classification Search .................. 707/802, 707/737, 999.002
See application file for complete search history.

(56) References Cited

U.S. PATENT DOCUMENTS

| | | | |
|---|---|---|---|
| 6,250,930 B1 | 6/2001 | Mintz | |
| 6,360,216 B1 | 3/2002 | Hennessey et al. | |
| 6,564,202 B1 | 5/2003 | Schuetze et al. | |
| 6,694,307 B2 | 2/2004 | Julien | |
| 6,697,998 B1 | 2/2004 | Damerau et al. | |
| 6,968,338 B1 | 11/2005 | Gawdiak et al. | |
| 7,194,483 B1 | 3/2007 | Mohan et al. | |
| 7,389,306 B2 | 6/2008 | Schuetze et al. | |
| 7,395,256 B2 | 7/2008 | Ji et al. | |
| 7,409,393 B2 | 8/2008 | Gregoire et al. | |
| 7,630,946 B2 * | 12/2009 | Acharya | 706/45 |
| 7,634,467 B2 * | 12/2009 | Ryan et al. | 1/1 |
| 7,647,335 B1 | 1/2010 | Colecchia | |
| 7,657,506 B2 * | 2/2010 | Levin | 707/999.002 |
| 7,809,726 B2 | 10/2010 | Flanagan | |
| 7,813,919 B2 | 10/2010 | Goutte | |
| 7,853,595 B2 | 12/2010 | Chew et al. | |
| 7,890,514 B1 * | 2/2011 | Mohan et al. | 707/748 |
| 2002/0143755 A1 | 3/2002 | Wynblatt et al. | |
| 2005/0108256 A1 | 5/2005 | Wakefield et al. | |
| 2006/0026114 A1 | 2/2006 | Gregoire et al. | |
| 2006/0161531 A1 | 7/2006 | Khandelwal et al. | |
| 2007/0011134 A1 | 1/2007 | Langseth et al. | |
| 2007/0112714 A1 | 5/2007 | Fairweather | |
| 2008/0027893 A1 | 1/2008 | Cavestro et al. | |
| 2008/0189163 A1 * | 8/2008 | Rosenberg et al. | 705/9 |

(Continued)

OTHER PUBLICATIONS

Application and File History of U.S. Appl. No. 12/105,598, Inventors Guha et al., filed Apr. 18, 2008.

(Continued)

*Primary Examiner* — Debbie Le
(74) *Attorney, Agent, or Firm* — Patterson Thuente IP

(57) ABSTRACT

A method and system for adaptive classification during information retrieval from unstructured data are provided. The method includes receiving input from a user defining a classification. A sample set of unstructured data based on the user defined classification defined is determined. The sample set of unstructured data is analyzed to determine a classification mapping that maps attributes of the sample set of unstructured data to class labels for the classification. The attributes of a set of data objects in a second set of unstructured data are indexed and one or more data objects in the set of data objects are mapped to the class label based on the classification mapping. Feedback based on the user's response to an interaction with results is determined using the class label. Finally, adaptive classification mapping is performed based on analysis of feedback by adjusting the sample set of data objects.

14 Claims, 8 Drawing Sheets

U.S. PATENT DOCUMENTS

2009/0157812 A1* 6/2009 Bavly et al. .................. 709/204

OTHER PUBLICATIONS

Application and File History of U.S. Appl. No. 12/587,492, Inventor Guha, filed Oct. 7, 2009.

Lucene, aquired at: http://lucene.apache.org/, the Apache Software Foundation, 2007, 4 pages.

Xiaojin Zhu, "Semi-Supervised Learning Tutorial," International Conference on Machine Learning (ICML), Jun. 2007, 156 pages.

T. Joachims, et al., Search Engines that Learn from Implicit Feedback, IEEE Computer, IEEE Computer, vol. 40, No. 8, Aug. 2007, 7 pages.

D. Eck, et al., "Autotagging Music Using Supervised Machine Learning," 8th International Conference on Music Information Retrieval (ISMIR), Sep. 2007, 2 pages.

F. Radlinski, et al. "Active Exploration for Learning Rankings from Clickthrough Data," Proceedings of the ACM Conference on Knowledge Discovery and Data Mining (KDD), ACM, Aug. 2007, 10 pages.

M. Hearst, "Clustering versus Faceted Categories for Information Exploration," Communications of ACM, Apr. 2006, pp. 59-61.

C.J.C. Burges, "A Tutorial on Support Vector Machines for Pattern Recognition, Data Mining and Knowledge Discovery," 2, 121-167, Kluwer Academic Publishers, Boston, 1998, 47 pages.

David M. Blei, et al., "Latent Dirichlet Allocation," Journal of Machine Learning Research 3 (2003), pp. 993-1022.

* cited by examiner

ADAPTIVE DATA CLASSIFICATION FOR DATA MINING

CROSS REFERENCES TO RELATED APPLICATIONS

This application claims priority to the following application, hereby incorporated by reference, as if set forth in full in this application U.S. Provisional Patent Application Ser. No. 61/012,761, entitled ADAPTIVE DATA CLASSIFICATION FOR DATA MINING, filed Dec. 10, 2007.

BACKGROUND

Particular embodiments relate generally to data management and more specifically to adaptively classifying unstructured data.

Data management is significant for all organizations. Growing organizations witness exponential growth in their data reserves. Organizations use databases to manage their data reserves. The databases help users organize and manage the data, and also enable the users to access the data whenever required. The databases enable users to input search queries, for example, Structured Query Language (SQL) queries, and help them retrieve the required data from the databases. Generally, organizations have several databases to collect and store data. Alternatively, the organizations can also have a centralized database to collect and store data.

Unstructured data (or unstructured information) includes information that either does not have a data structure or has one that is not easily usable by traditional computer programs. Unstructured data is opposed to structured data such as, for example, data stored in fielded form in databases or annotated (using tags, metadata, etc.) in documents. Examples of unstructured data include, but are not limited to, text files such as Microsoft Word documents, Portable Document Format (PDF) files, email records; image files such as Joint Photographers Experts Group (JPEG) files, Tagged Image File Format (TIFF) files, Graphics Interchange Format (GIF) files; audio files such MP3, Windows Media files; video files such as Waveform Audio format (WAV) files, Moving Pictures Experts Group (MPEG4) files. Market research reveals that unstructured data accounted for 6 petabytes of capacity in 2007, and is expected to grow at an annual rate of 54% to 27.5 petabytes by 2010.

Data retrieval using unstructured data can be difficult since there may not be identification attributes such as tags or metadata associated with the unstructured data.

In addition, users generally prefer to retrieve information based on content and context of the information instead of retrieving by using explicit names of files. Information retrieval by using a name may not be very helpful in accessing unstructured data, such as in cases where it is desirable to use using imprecise queries where names and paths to the files are not specified. Examples of search queries may include finding all documents that are related to Joe Smith, or finding all images that contain an image of a car. It does not help that naming conventions for files have no relationship to the content or the context. Moreover, most unstructured data is not tagged or classified by creators or users since it consumes a considerable amount of time. Additionally, the classification done by creators and users is not consistent.

However, various methods to solve the problem of information retrieval from unstructured data are available. One of the methods for retrieving information from unstructured data is applicable when the underlying structure of the data model or the context of the data is well known. In such a case, the data can be parsed and, subsequently, entered into a database. Thereafter, information retrieval can be achieved through standard SQL queries on the database.

Another method for retrieving information from unstructured data is applicable when the underlying structure of the data model is not known but a specific document can be well characterized by a set of key words. In such a case, a search using explicit keywords (or tags) can be carried out for information retrieval. These methods are imprecise and may result in search results for a query that are not satisfactory to a user. If the user is not satisfied, the user can change the search terms used. This, however, does not address the fact that the results for the initial search query were not satisfactory.

However, the methods mentioned above for information retrieval can become cumbersome. For example, if it is not known how to characterize the context of the information retrieval query, especially when the knowledge sought is implicit. Second, when the rules of classification specific to business cannot be specified, i.e., a narrow classification rule is required as opposed to a broad rule specified by regulatory compliance needs. Also, the needs of the business may change over time and, therefore, the classification of information will also need to be revised to incorporate the evolving nature of the organization.

SUMMARY

Embodiments of the invention include a method, apparatus, and/or system for adaptive classification during information retrieval from unstructured data. One embodiment comprises receiving input from a user defining a classification; determining a sample set of unstructured data based on the classification defined by the user; analyzing the sample set of unstructured data to determine a classification mapping, which maps attributes of the sample set of unstructured data to class labels for the classification; indexing attributes of a set of data objects in a second set of unstructured data; mapping multiple data objects in the set of data objects to the class label based on the classification mapping, which maps indexed attributes of the multiple data objects to the class label. Additional embodiments include determining feedback based on the user's response to an interaction with the class label; adapting the classification mapping, based on an analysis of the feedback by adjusting the sample set used to determine the classification mapping to the class label.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

DETAILED DESCRIPTION OF EMBODIMENTS

Particular embodiments of the present disclosure provide a method and apparatus for adaptive classification during information retrieval from unstructured data. A search query in the form of an input from a user is received. The user defines a classification of the unstructured data, based on which a sample set of unstructured data is determined. The sample set of unstructured data is then analyzed to determine a classification mapping, which maps attributes of the sample set of unstructured data to class labels for the classification. Thereafter, attributes of a set of data objects in a second set of the unstructured data are indexed. One or more data objects in the set of data objects are mapped to the class label, based on the classification mapping that maps indexed attributes of the one or more data objects to the class label. Moreover, the process of adaptive classification during information retrieval from unstructured data includes determining feedback based on the user's response to an interaction with search results determined using the class label. Finally, adaptive classification is facilitated by an analysis of the feedback, by updating the sample set used to determine the classification mapping to the class label.

Figure 1:
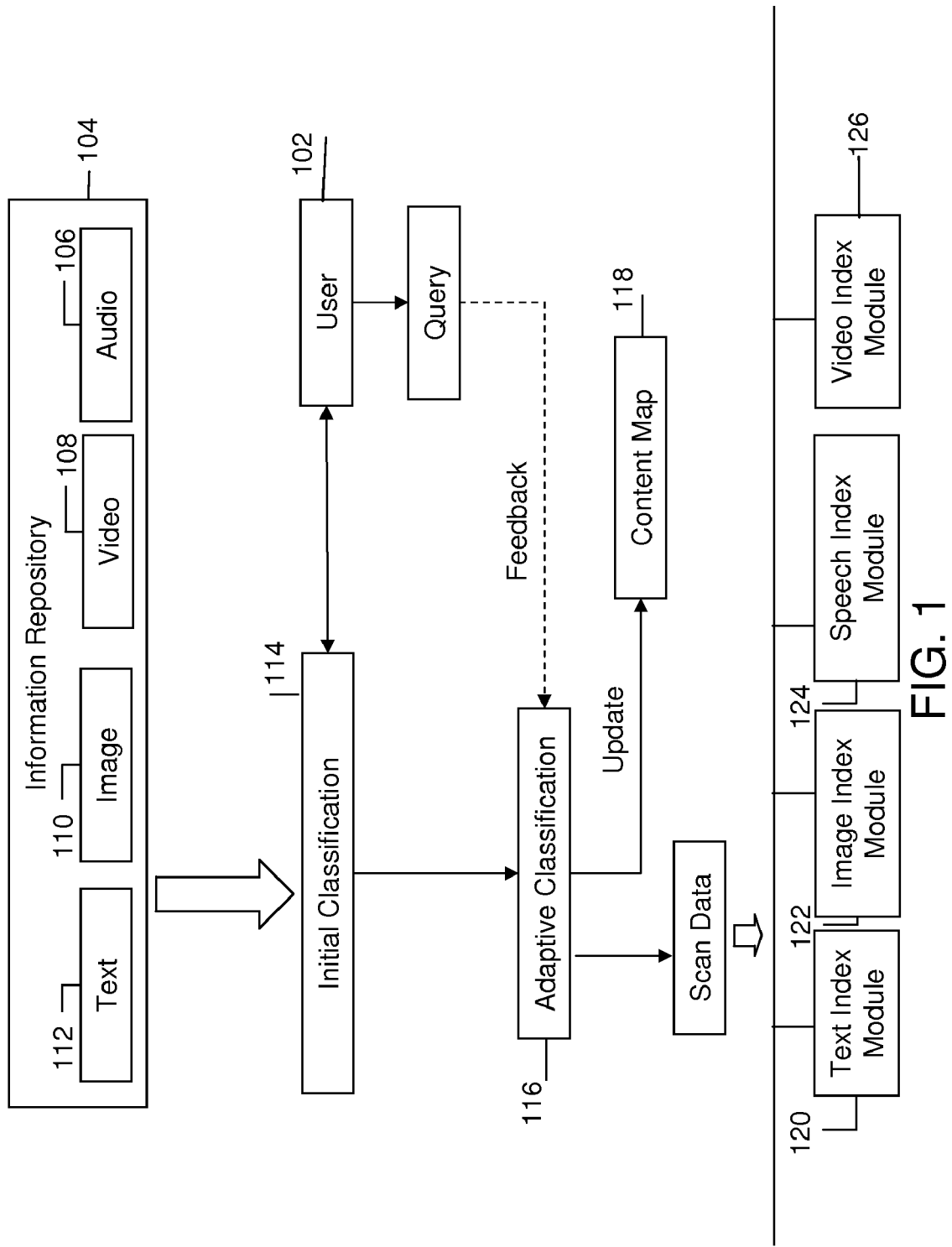
FIG. 1 illustrates an exemplary setup for adaptive classification during information retrieval from unstructured data, in accordance with various embodiments.

FIG. 1 depicts an exemplary method of adaptive classification during information retrieval from unstructured data. FIG. 1 depicts a user 102, and an information repository 104. The information repository 104 comprises unstructured data and can be referred to as a data source. The information repository 104 comprises data of various types such as audio 106, video 108, images 110, and text 112. Also shown are an initial classification 114, an adaptive classification 116, and a content map 118.

The metadata associated with the unstructured data is contained within the information repository 104. The user 102 is prompted to create the initial relevance classes. The user 102 can define the initial classification 114 via any combination of the following options: a) using combination of keywords; b) using specific names, i.e., named entities; c) using sample documents. Keywords are a list of words or phrases which have been explicitly designed by the user to define the initial classes. These are treated as properties of the class. A document which belongs to a particular class is expected to contain a high frequency of some or all of the keywords of the class. Hence keywords can be used by the user 102 to define the initial relevance classes in one embodiment of the invention. However, occurrence of keywords is neither a necessary nor sufficient condition of class membership. Named entities include a list of specific names, such as names of places, persons or products, etc. that is explicitly defined by the user who is defining the initial relevance classes. These are treated as identities of the class. In one embodiment of the invention, documents that include any of the named entities are assumed to be a member of the class. This assumption can be overridden by the sample document list. Other embodiments can use different rules or criteria for using the named entities to identify a member of a class. For example, two or more occurrences of named entities may be required to identify a member of a class. Or multiple occurrences, use of additional keywords, distance between keywords and entities and other factors can be used. The sample documents are examples of data objects that belong to a given class, and therefore, can be used to train and build a data object classifier. The initial classification 114 is performed by explicit user input in one embodiment. Thus, the initial classification 114 of unstructured data can be performed by preparing a sample random small set, for example, 5% of all possible class data, to create a training set. A subset of full keyword index used as input can be determined from the training set. A trained data object classifier can be run on the data set to determine the class membership of all data. The relevance classes defined by the initial classification 114 form the basis of the adaptive classification 116.

While the presence of named entities identifies class membership, the presence of keywords can be used to augment the class membership, i.e., a document containing high frequency of keywords or related words may become a member of the class even in the absence of named entities. Sample documents, on the other hand, are unambiguous and used to tune the class definition solely based on words or phrases, i.e., if words or phrases simply do not adequately describe the class, then the presence of sample documents can be used to disambiguate it.

A list of all indexed keywords or features, known as index vectors, is stored in the content map 110, that captures all content related information of the data objects indexed. Features refer to objects which are non-text and may not contain keywords. An example of a content map may be Cortex™. The content map 110 records references to data objects, instead of storing the actual data objects or records, as discovered during the index and scanning process. The content map 110 is updated as new data is added. The data files, after the classification, are stored in relevant index modules. Data classified as text is stored in a text index module 120 and, data classified as image is stored in an image index module 122. Similarly, data classified as speech is stored in a speech index module 124 and data classified as video is stored in a video index module 126.

Since the initial classification 114 is a preliminary classification, which may not be correct or complete, a need for the initial classification 114 to be corrected or updated at a later time may arise. This updating or correcting of the initial classification 114 is done through automated relevance classification to result in the adaptive classification 116. The adaptive classification 116 updates the relevance classes on the basis of the feedback received from users over time or on the basis of implicit feedback extracted from the result sets displayed to the users.

Once the initial classification 114 is complete, the user 102 inputs his/her search query to retrieve information from the unstructured data. As a result, the system displays results to the user 102 for his/her query. Once the results have been displayed to the user 102, the user 102 judges the accuracy of the results. If certain documents in the result set are misclassified, then the user 102 can inform the system about the misclassification in the form of a feedback. Feedback provided by the user 102 can be explicit or implicit.

The user 102 can provide explicit feedback by indicating the document, which is misclassified in the result set. The adaptive classification 116 then updates the relevance classes on the basis of the misclassified result. The adaptive classification 116 also updates the content map 118 to incorporate the changes in the relevance classes. In accordance with an embodiment of the disclosure, in case the user 102 does not wish to explicitly provide feedback, then the system can extract implicit feedback from the user 102. An implicit feedback requires the system to navigate through the search history and determine user preferences in selecting the desired information from the returned result set. The implicit feedback obtained is used to update the relevance classes through the adaptive classification 116. Once the relevance classes have been updated, the list of keywords stored in the content map 118 are also updated. The updated classification mapping will ensure that the user 102 is presented with more accurate results the next time a similar search query is entered.

In accordance with various embodiments of the disclosure, to execute this method, a processor is provided to execute a logic, which when executed is operable to perform the initial classification 114, adaptive classification 116 on the basis of feedback received from a user, and update the content map 118. These processes have been explained in detail in the following description.

Figure 2:
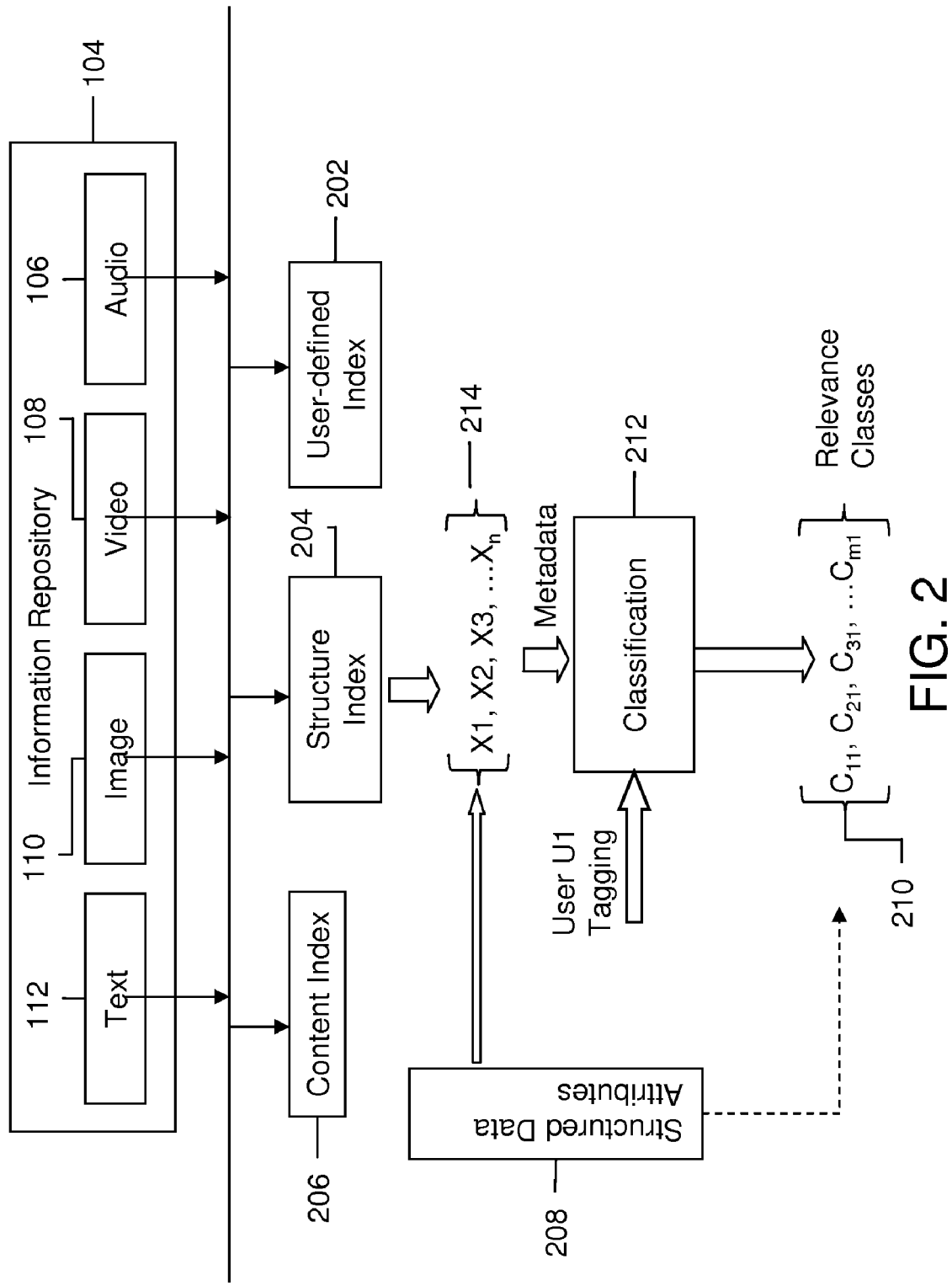
FIG. 2 illustrates a detailed description of adaptive classification, in accordance with various embodiments.

FIG. 2 illustrates a detailed description of the adaptive classification 116, in accordance with various embodiments. FIG. 2 depicts the information repository 104 comprising data of various types such as audio 106, video 108, images 110, and text 112. FIG. 2 also contains a user-defined index 202, a structure index 204, and a content index 206. Further, FIG. 2 comprises structured data attributes 208, a classification 212, data files 214 represented as $X_1, X_2 \ldots X_n$, and relevance classes 210. The adaptive classification 116 is based on mapping the document feature indices (keywords, attributes, structure, provenance, etc.) to relevance classes using algorithms such as Machine Learning (ML). Since the mapping is set up between predefined classes and the feature indices of the documents, it is agnostic of the type of document that is mapped to a class. Therefore, any document, such as a text document whose indices are keywords, or an image, whose indices are specific visual features, can be mapped to a class based on its indices. The indices are classified as the user-defined index 202, the structure index 204, and the content index 206. The data files 214 are represented as $X_1, X_2 \ldots X_n$. The mapping of a document's indices to a relevance class can be represented as:

$$\{x_i \in R^n\} \rightarrow \{I^m\}$$

where n is a maximum number of indices per document, $I^m$ is the m-dimensional integer space m is the dimension of the classification space, and with m<<n, since the number of classes are generally smaller than the number of indices.

The structured data attributes 208 represent, as examples, the stored properties of structured data, which can help in classifying the data files 214 into the respective indices, and for mapping them to the respective relevance classes. The metadata associated with untagged data is also extracted to associate the untagged data with the appropriate relevance class, based on the classification 212. Since the relevance classes are initially defined by using examples or by providing a small set of examples that constitute a training set, the classification 212 can be implemented using ML algorithms such as semi-supervised machine learning algorithm (SSML), supervised machine learning algorithms, and unsupervised machine learning algorithms. Examples of such machine learning algorithms include kernel classification methods, such as using semi-supervised Support Vector Machines or transductive Support Vector Machines. Since the user 102 is expected to tag a small fraction of the data, or a few documents, ML algorithms allows automated tagging of the untagged data based on learning from the user-tagged data. Examples of classification algorithms are cosine distance, LibSVM, LibLinear, and Fisher LDA. In particular, cosine distance measures the distance between documents as represented by the feature vectors of the documents. The cosine distance is basically a dot product operation of normalized feature vectors. When training samples from both classes are available, a document is tagged based on the closest document measured by the cosine distance. The cosine distance approach also supports model building for single class training samples. To build a model based on only single class samples, the threshold cosine distance is picked by measuring the distance distribution of random document pairs for each data source. In one current implementation, the 95 percentile value is used (i.e., the distance value is greater than 95% of the random pairs chosen).

The LibSVM approach is based on the C-SVM implementation with Gaussian kernel. When sufficient training samples are available, the model picks the best C and sigma values using five-fold cross validation.

The LibLinear algorithm is a C-SVM like classifier operating in linear space. When sufficient training samples are available, the model picks the best C value using five-fold cross validation.

FisherLDA is an implementation of linear discriminant analysis or LDA. When sufficient training samples are available, the model picks the best feature number using five-fold cross validation.

The data tagged by the user 102 is directly classified into the relevance class, based on the classification 212. The data is classified into the respective relevance classes 210, such as $C_{11}, C_{21}, C_{31}, \ldots, C_{m1}$. After the training set is defined, a subset of full keyword index can be provided as an input by the user 102. Thereafter, in a run-time mode, the trained classifiers are executed on the data sources and the class membership of the scanned data is determined.

In another embodiment, multiple classification maps are maintained on the data to meet different user classification rules. This is necessary because different users may define different relevance classes on the same data. Hence, a single data object may belong to multiple different relevance classes.

Also, a particular data can belong to multiple classes, with different probabilities of membership into different relevance classes. Therefore, multiple maps can be used to classify a data into multiple relevance classes. For example, a file containing a speech in writing, with an embedded audio recording of the speech, can be classified into text as well as audio relevance class. In such a situation, multiple mapping of the data into different relevance classes is required.

Figure 3:
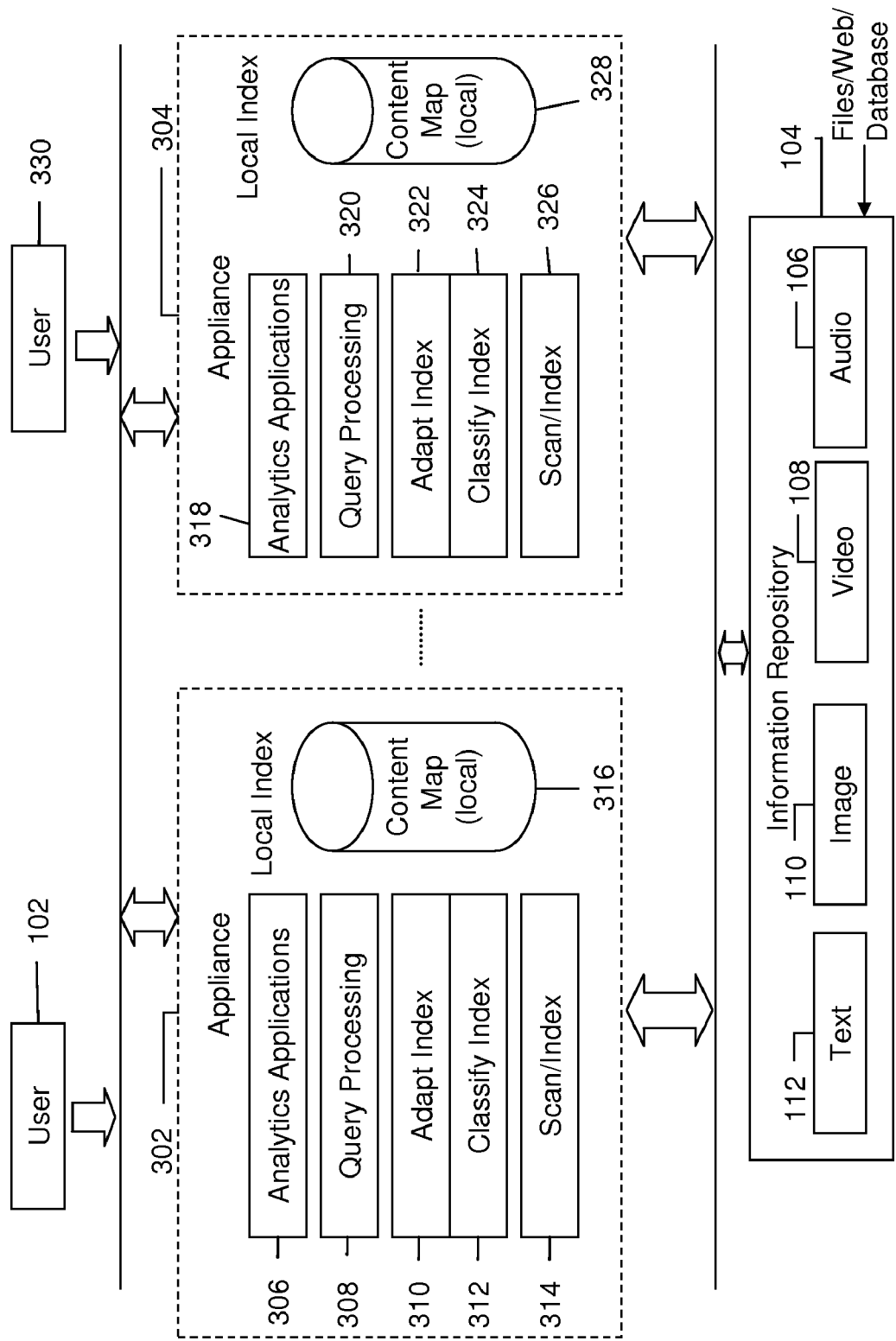
FIG. 3 illustrates an exemplary implementation of clustering appliances for scaling out classification and information retrieval, in accordance with various embodiments.

FIG. 3 illustrates an exemplary implementation of clustering appliances for scaling out classification and information retrieval, in accordance with various embodiments. FIG. 3 comprises the user 102, another user 330, appliances 302 and 304. The appliance 302 comprises analytics applications 306, a query processing 308, an adapt index 310, a classify index 312, a scan/index 314, and a content map 316. Similarly, the appliance 304 comprises analytics applications 318, a query processing 320, an adapt index 322, a classify index 324, a scan/index 326, and a content map 328.

Appliance 302 and appliance 304 can also be referred as computing nodes. Appliance 302 and appliance 304, or the two computing nodes depict a situation when a level of data retained expands over time. With the increasing levels of data, the classification computing infrastructure needs to be scaled to handle the size of the index as well as to handle the indexing and classification processing. The appliances (or the computing nodes) 302 and 304 are used for scanning and indexing 314 and 326, classifying index 312 and 324, query processing 308 and 320, and analytics applications 306 and 318. The appliances 302 and 304 functioning concurrently enable parallel computing with the use of Machine Learning (ML)

algorithms. The parallel computing is parallelized across the appliances 302 and 304 and their local data index.

An interactive query entered by the user 330 is analyzed at the analytics applications 318. The interactive query is processed to determine its characteristics at the query processing 320. The list of all indexed keywords or features, knows as index vectors, is stored in the content map 328. The interactive query entered by the user 330, after processing, is compared with the list of keywords and indices stored in the content map 328. The stored keywords and indices are used to adapt the index for the interactive query entered by the user 330 at adapt index 322. The adaptive index is also updated regularly based on the feedback received. The feedback is received from users in explicit or implicit form. The users can identify misclassified results and data objects and inform the system in the form of feedback. The adapt index 322 incorporates the feedback into the relevance classification mapping and updates the relevance classes. The classification of the index takes place at classify index 324, and if a new index has been defined, then the content map 328 is updated with the new index. After the classification of the data, the data is scanned and indexed at scan/index 326 to extract the different keywords and indices. Different search and/or indexing modules are used to extract the key features and metadata (content as well as structure). A similar operation takes place at the appliance 302 to handle large amounts of data.

Figure 4:
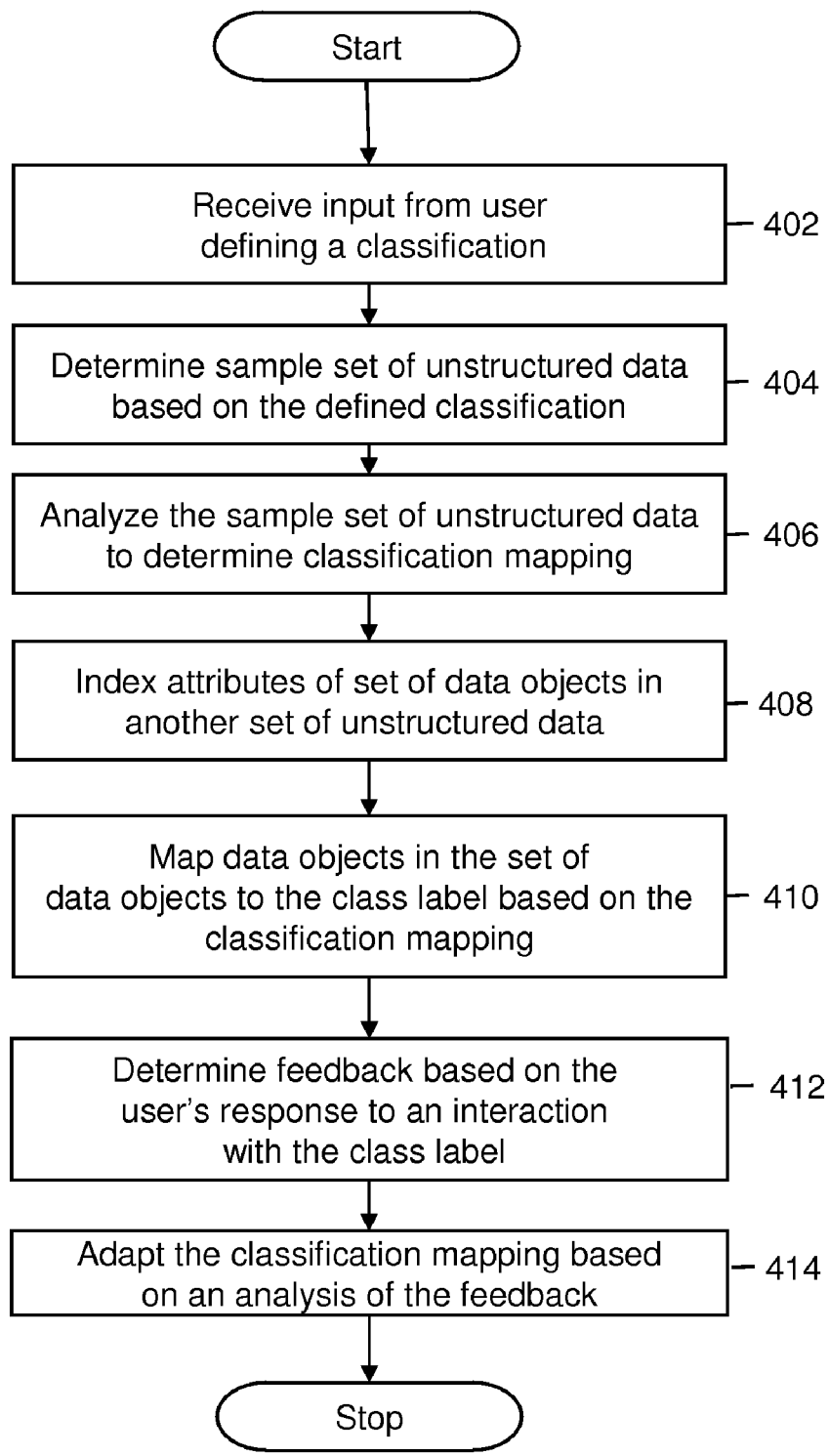
FIG. 4 illustrates a flowchart of a method for retrieving information from unstructured data, in accordance with various embodiments.

FIG. 4 illustrates a flowchart of a method for retrieving information from unstructured data, in accordance with various embodiments. At step 402, an input defining a classification is received from the user 102. The user 102 initially defines the classification based on user-defined parameters. At step 404, a sample set of unstructured data is determined based on the classification defined by the user 102. The sample set of unstructured data can be retrieved on the basis of the keywords associated with the classification. At step 406, the sample set of unstructured data is analyzed to determine classification mapping. The classification mapping maps attributes of the sample set of unstructured data to class labels for the classification. The attributes of a set of data objects are indexed in a second set of unstructured data, at step 408. The initial classes defined by the user 102 are on the basis of a combination of keywords, features or examples documents in text, image, video, or audio. An example of the user interaction is shown in FIG. 7.

Figure 7:
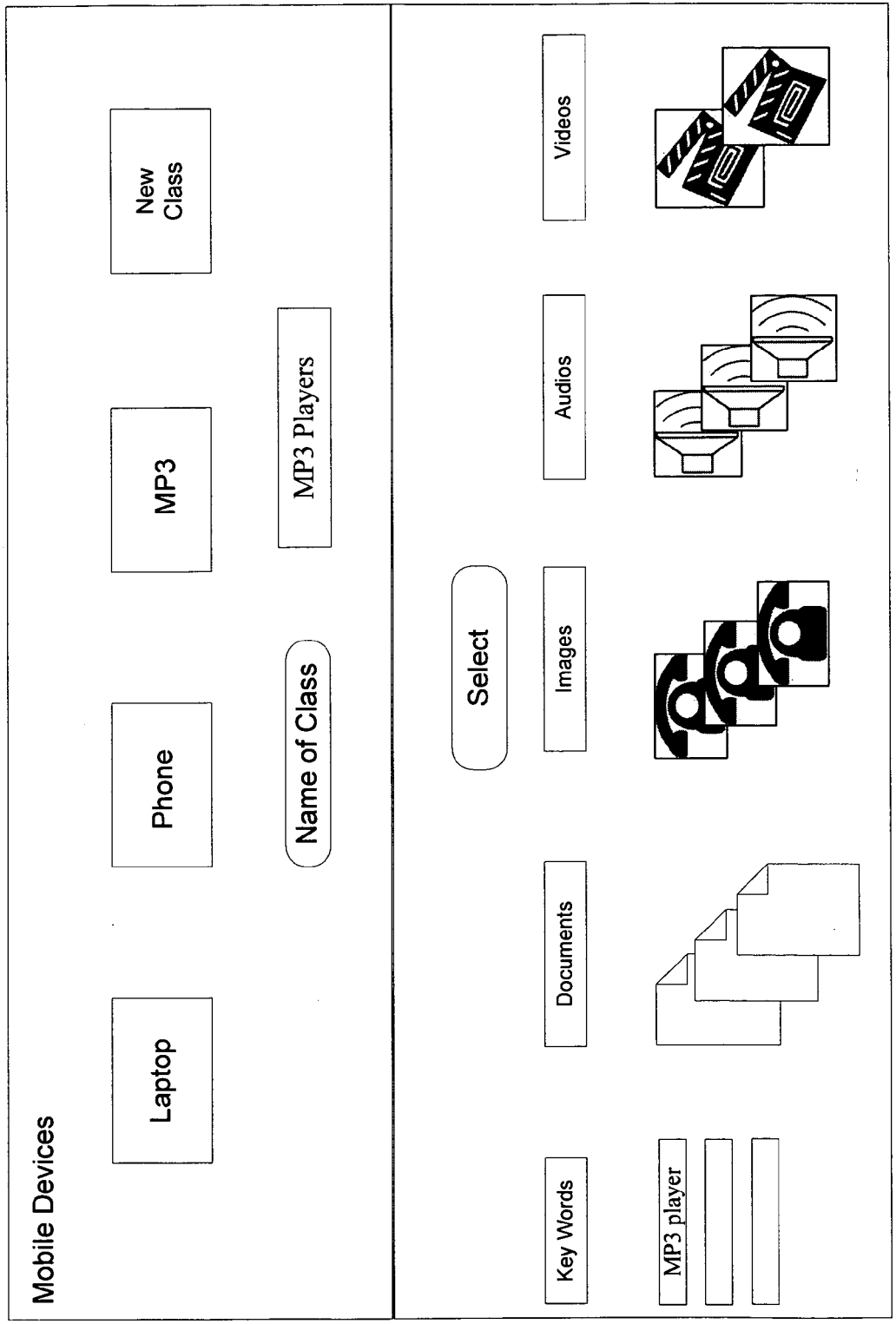
FIG. 7 is a screenshot illustrating initial classification executed by a user, in accordance with an embodiment.

As shown in FIG. 7, the user 102 can create the initial classes on the basis of a set of keywords available. The user 102 can also choose to create the initial classes on the basis of documents, images, audio, or video. For example, the user 102 can define that the keyword 'music' pertains to images of artists, MP3 songs in audio files, and so forth.

At step 410, one or more data objects in the set of data objects are mapped to the class label, based on the classification mapping that maps indexed attributes of the one or more data objects to the class label. For example, a data object or a data file with a Joint Photographic Experts Group (JPEG) extension is mapped to the class label, 'image'. At step 412, feedback based on the user's response to an interaction with the class label is determined. The feedback from the user 102 helps in determining the accuracy of the classification. For example, the user 102 may be prompted to give feedback on the search results that are obtained based on his/her query. The feedback given by the user 102 ascertains the appropriateness of the search results. At step 414, adaptive classification mapping is performed, based on an analysis of the feedback, by adjusting the sample set used to determine the classification mapping to the class label. For example, if the feedback received from the user 102 identifies the returned result set as misclassified, then the returned result set is reclassified on the basis of the feedback received. Adaptive classification ensures that the relevance classes are updated over time. This is essential because the initial classification may not be correct or accurate. Adaptive classification also helps take care of an organization's changing needs. Therefore, adaptive classification ensures that the relevance classes are up to-date and incorporate changing user preferences over time.

Figure 5A:
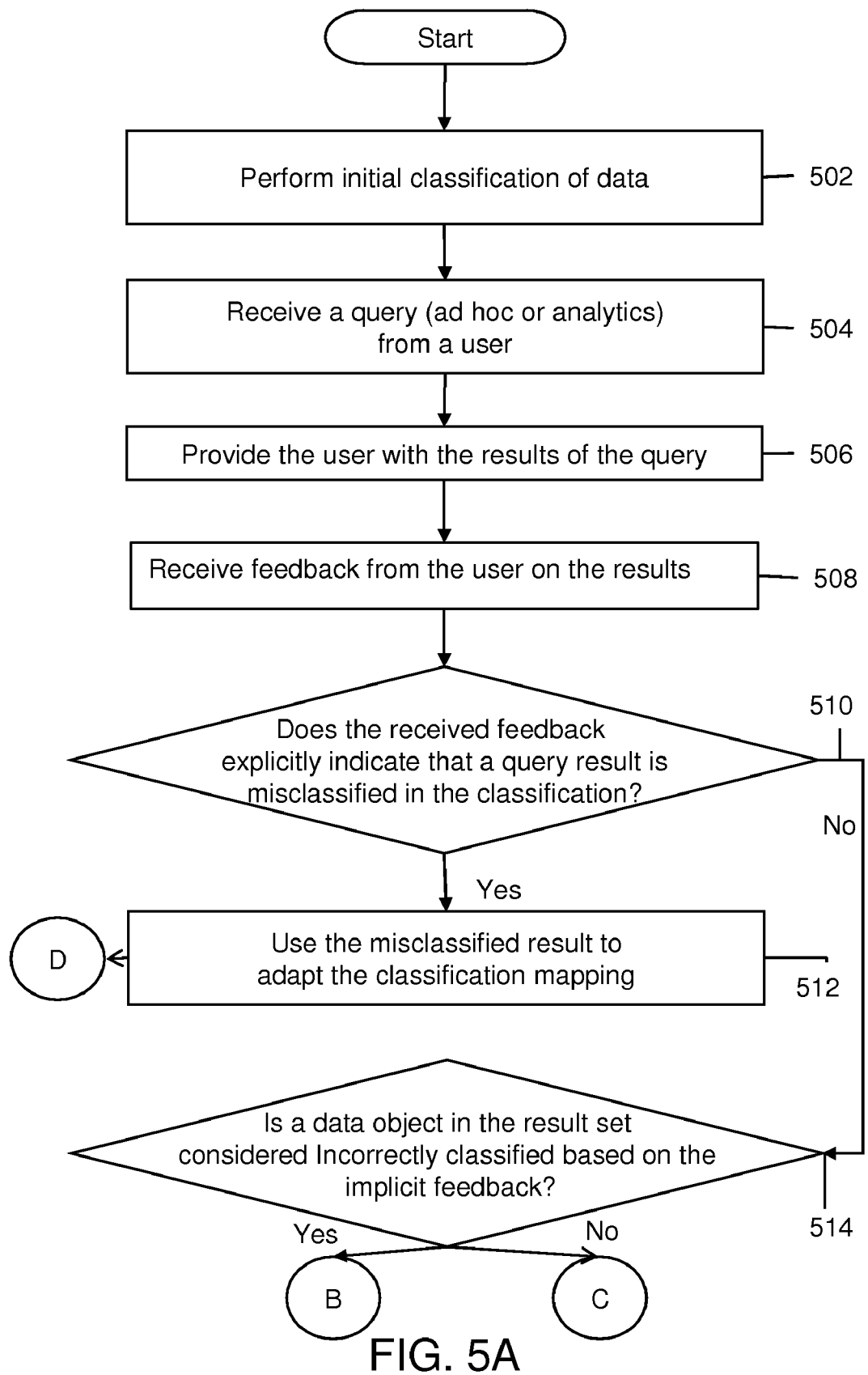
FIGS. 5A and 5B illustrate a detailed flowchart of a method for adapting classification, based on a user's feedback, for facilitating information retrieval from unstructured data.
Figure 5B:
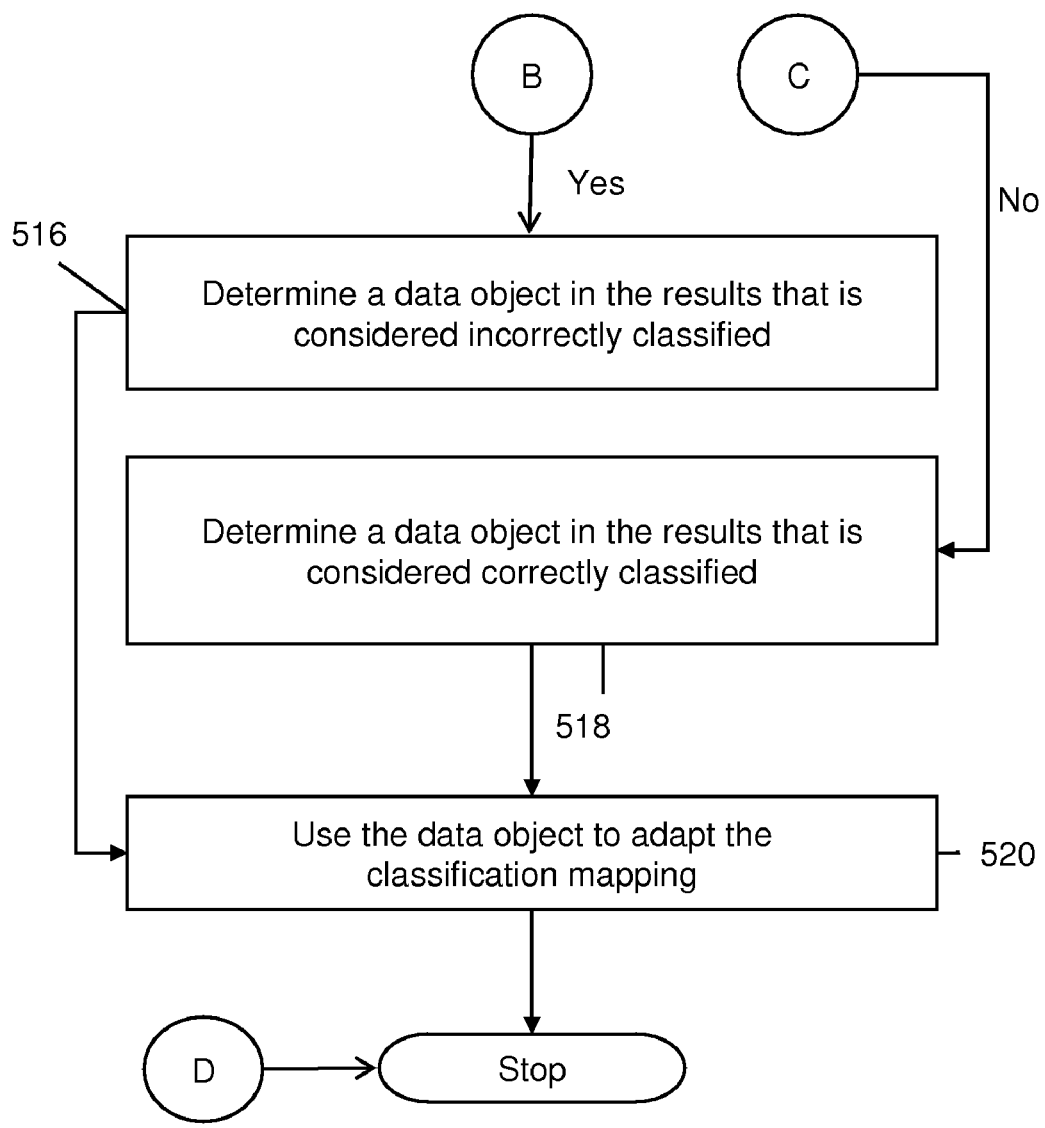

FIGS. 5A, and 5B illustrate a detailed flowchart of a method for adapting classification, based on a user's feedback, for facilitating information retrieval from unstructured data, in accordance with an embodiment. The initial classification of data is performed at step 502. A user can provide the initial relevance classes on the basis of sample documents or a combination of keywords. At step 504, an interactive query is received from a user. The interactive query can be in the form of a name of a data object or keywords indicative of the data object. The results of the interactive query are displayed to the user at step 506. Feedback on the returned result set is received from the user at step 508. For an exemplary purpose, a user wants to view stocks of a particular company in the pharmaceutical domain. The user inputs his/her choice in a dashboard displayed to the user. The user can input search terms such as 'initial public offering' for the class representing the pharmaceutical class. A result set is then displayed to the user upon execution of the interactive query. The result set may comprise recent news articles or company press releases. The user scans through the result set and selects the result, which is most useful to him/her. In case the desired result is not available in the returned result set, the user may be prompted to check items that seem misclassified. A user may provide an explicit or an implicit feedback.

At step 510, it is determined whether the received feedback explicitly indicates that a query result is misclassified in the classification. Explicit feedback indicates to the system, the correct class for a misclassified data object. Explicit feedback can be provided when a user viewing results of a query or dashboard graphical results of an analytics, provides specific feedback to state that the results are incorrect. For example, a user inputs an ad-hoc query on the class. Based on the results displayed to the user, the user can choose to either indicate that the result was misclassified, or the user can correct the displayed result by specifying the correct class where the misclassified result should fall under. The user can employ a drag and drop method to indicate classification that a document returned in the query response is incorrectly classified.

Alternatively, a more detailed method of obtaining explicit feedback is also provided. When a user classifies a particular document in the result set as misclassified, the data points associated with the document can be displayed to the user. The user can then select the data point which is wrong. Thus, the user has the ability to select the misclassified document in terms of its class or even named entity. This option allows the user to correct the classification for certain documents or even create new classes, if desired.

Thereafter, the misclassified results are used to adapt the classification mapping at step 512. Typically, explicit feedback indicates to the system what the correct class should be for a data object.

In another embodiment, if the determination of the received feedback at step 510 shows that the user does not want to express feedback explicitly, it is determined that the feedback from the user is implicit. Typically, in implicit feedback, the system needs to infer what the correct class should be, or at least infer that the current choice is not correct. The implicit feedback can be identified by tracking the results selection or by tracking the navigation history. In tracking the results selection, one specific approach is to examine the results that have been selected during an ad hoc query response. The approach assumes that if the user does not select the highest ranked result obtained from the ad hoc query response, then the user has found the documents not to be the most relevant. This is a probabilistic approach since the user may be responding to the level of relevance and not necessarily on the classification. Adopting this approach, the order of relevance can be changed, which in turn can be used to change the degree of class membership. Another extension of this approach is to examine the navigation history during an ad hoc query. This requires examining document data objects selected every time similar queries are presented. If the user prefers to select a specific subset of data objects, then examining the history and looking at the underlying features will indicate that some objects are more likely not in the correct class and should not be classified with objects that have been selected.

At step 514, it is determined from the implicit feedback whether a result is incorrectly classified. Since the sequence of navigation, i.e., the order of documents or document sets that the user retrieves, is related to the user's definition of relevance or context, the sequence of navigating through different data that the user is retrieving provides hints implicitly on refining the classification. The same approach is used to refine the relevance classification definition as the user navigates to select the desired object when the user is presented with multiple documents that match the query parameters. The data object which is incorrectly classified is identified at step 516. This data object identified is used to adapt the classification mapping at step 520. The data objects that are considered correctly classified, based on the implicit feedback, are identified at step 518. The correctly classified data objects are further used to adapt the classification mapping at step 520. Adaptive classification ensures that all misclassified data is correctly classified and that the user gets more accurate results every time a new search query is entered.

Figure 6:
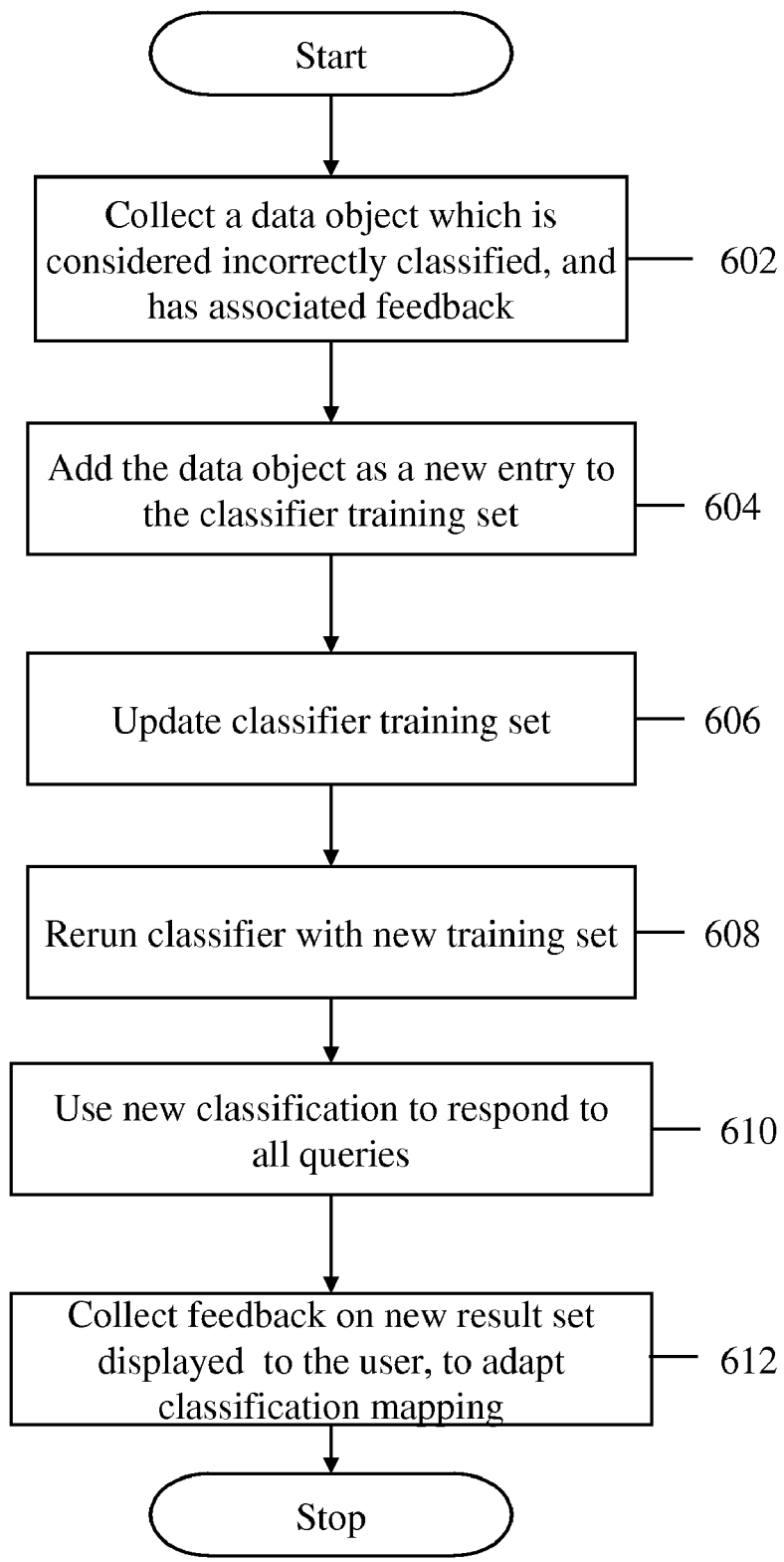
FIG. 6 is a flowchart of a process of using a data object to adapt a classification mapping.

FIG. 6 illustrates a detailed flowchart explaining the process of using the data object to adapt the classification mapping. At step 602, a data object which is considered incorrectly classified is collected. The data object has associated feedback from the user regarding the correct classification of the misclassified object. At step 604 the misclassified data object is added to the classifier training set as a new entry. The data object is added to the classifier training set with its estimated corrected class. The estimated corrected class is derived from explicit or implicit feedback collected. At step 606, the classifier training set is updated. The updated classifier training set is obtained by adding all new entries received during a pre-defined period, corresponding to the interval between classification updates. At step 608, the classifier training set is rerun at this stage, all the data objects are assigned new classes based on the updated classifier training set. At step 610, the updated relevance classes are used to respond to all queries. The system will collect feedback from the users on the result set displayed to the users with the updated classification at step 612. This feedback collected from users will again be used to reclassify misclassified data objects as new entries in the classifier training set. The query results are changed on the basis of the updated relevance classes and the user receives more accurate results. The process described above for adaptive classification is continuous which is performed to adapt the relevance classification and update the relevance classes.

While the classification mapping is adapted based on the processing of the explicit or implicit feedback received from the user, the training set that underlies the classification is updated. As described above, the training set can be represented as a map that is defined as:

$$\{x_i \epsilon Z_n\} \rightarrow \{I^m\},$$

where m<<n and there are P instances of the inputs where $\{x_i\}$ is the set of attributes and $\{I^m\}$ is the m-dimensional integer space.

If the initial classification assumed that the label set for all data objects is set I, where, for one specific embodiment, I is the column vector of dimension P, each entry being the label set for the training corpus member. When the classification for a data object is adapted, then for a specific data object, for example, X', the class applicable may be changed from the original i' to i*. Therefore, the set of equations representing the map is modified to I* where the classification entry for X' has been changed from i' to i*. This new equation set is then solved to result in a new classification map. The result of the new classification indicates that the data object X' is mapped to class i*.

Particular embodiments of the present disclosure provide a method and apparatus for adaptive classification during information retrieval from unstructured data that have various advantages. A user is enabled to retrieve information easily from unstructured data. The unstructured data can be searched on the basis of a collection of keywords, text, image, audio, and video. The disclosure enables automated or adaptive classification, which eliminates manual efforts required to update relevance classes for unstructured data. Further, the disclosure provides rapid adaptive classification by means of explicit or implicit feedback received from users. The re-classification process is incremental in nature and enables new changes to take place immediately after the feedback is received. Particular embodiments will be useful to organizations where the size of unstructured data increases every day.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the contest clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A computer-implemented method comprising:
using a programmed digital computer to automatically perform steps comprising:
receiving input from a user defining a classification;
determining a sample set of unstructured data based on the classification defined by the user;
analyzing the sample set of unstructured data to determine a classification mapping that maps attributes of the sample set of unstructured data to class labels for the classification;
indexing attributes of a set of data objects in a second set of unstructured data;
mapping one or more data objects in the set of data objects to the class label based on the classification mapping that maps indexed attributes of the one or more data objects to the class label;
receiving an ad-hoc query from the one or more users;
providing relevant results from the unstructured data based on the classification mapping of the indexed attributes of the one or more data objects and the query;
determining feedback based on the user's response to an interaction with results determined using the class label, wherein the user's response comprises explicit feedback received from one or more users who are viewing results determined using the classification mapping, and the explicit feedback comprises an indication that a result is misclassified in the classification; and
adapting the classification mapping based on an analysis of the misclassified result received as feedback by adjusting the sample set used to determine the classification mapping to the class label.

2. The computer-implemented method of claim 1, the steps performed by the programmed digital computer further comprising:
receiving an analytics query from the one or more users or viewing a predefined analytics query results display;
providing analytic results from the one or more data objects being mapped to the class label and the analytics query;
receiving the explicit feedback comprising an indication that an analytic result is misclassified in the classification; and
using the misclassified analytics result to adapt the classification mapping.

3. The computer-implemented method of claim 1, wherein the feedback is implicit feedback that infers relevant unstructured data is misclassified.

4. The computer-implemented method of claim 3, the steps performed by the programmed digital computer further comprising:
providing results for a query;
determining a data object in the results that is considered not incorrectly classified based on which documents in the results are selected; and
using the data object attributes and the feedback to adapt the classification mapping.

5. The computer-implemented method of claim 4, the steps performed by the programmed digital computer further comprising:
providing results for a query;
determining a data object in the results that is considered incorrectly classified based on a navigation history of a user selecting the results; and
using the data object to adapt the classification mapping.

6. The computer-implemented method of claim 1, wherein adapting the classification comprises:
adding a data object to the sample set; and
adapting the classification mapping based on the addition of the data object to the sample set.

7. The computer-implemented method of claim 6, the steps performed by the programmed digital computer further comprising mapping a new set of data objects to the associated class labels based on the adapted classification mapping.

8. An apparatus comprising:
one or more processors; and
logic encoded in one or more tangible media for execution by the one or more processors and when executed operable to:
receive input from a user defining a classification;
determine a sample set of unstructured data based on the classification defined by the user;
analyze the sample set of unstructured data to determine a classification mapping that maps attributes of the sample set of unstructured data to class labels for the classification;
index attributes of a set of data objects in a second set of unstructured data;
map one or more data objects in the set of data objects to the class label based on the classification mapping that maps indexed attributes of the one or more data objects to the class label;
receive an ad-hoc query from the one or more users;
provide the results from the relevant unstructured data based on the classification mapping of the indexed attributes of the one or more data objects and the query;
determine feedback based on the user's response to an interaction with results determined using the class label, wherein the feedback comprises explicit feedback received from one or more users who are viewing results determined using the classification mapping, and the explicit feedback comprises an indication that a result is misclassified in the classification; and
adapt the classification mapping based on an analysis of the misclassified result received as feedback by adjusting the sample set used to determine the classification mapping to the class label.

9. The apparatus of claim 8, wherein the logic when executed is further operable to:
receive an analytics query from the one or more users or viewing a predefined analytics query results display;

provide analytic results from the one or more data objects being mapped to the class label and the analytics query;

receive the explicit feedback comprising an indication that an analytic result is misclassified in the classification; and use the misclassified analytics result to adapt the classification mapping.

10. The apparatus of claim 8, wherein the feedback is implicit feedback that infers relevant unstructured data is misclassified.

11. The apparatus of claim 10, wherein the logic when executed is further operable to:

provide results for a query;

determine a data object in the results that is considered not incorrectly classified based on which documents in the results are selected; and use the data object attributes and the feedback to adapt the classification mapping.

12. The apparatus of claim 11, wherein the logic when executed is further operable to:

provide results for a query;

determine a data object in the results that is considered incorrectly classified based on a navigation history of a user selecting the results; and use the data object to adapt the classification mapping.

13. The apparatus of claim 8, wherein logic operable to adapt the classification comprises logic operable to:

add a data object to the sample set; and adapt the classification mapping based on the addition of the data object to the sample set.

14. The apparatus of claim 13, wherein the logic when executed is further operable to map a new set of data objects to the associated class labels based on the adapted classification mapping.

* * * * *